(12) United States Patent
Chaurasia et al.

(10) Patent No.: US 10,896,168 B2
(45) Date of Patent: Jan. 19, 2021

(54) APPLICATION-DEFINED OBJECT LOGGING THROUGH A FILE SYSTEM JOURNAL

(71) Applicant: HEWLETT PACKARD ENTERPRISE DEVELOPMENT LP, Houston, TX (US)

(72) Inventors: Rajesh Kumar Chaurasia, Bangalore (IN); Padmagandha Panigrahy, Bangalore (IN); Anand Satish Phatak, Bangalore (IN); Padmanabhan Selvakumarapalayam Nagarajan, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 620 days.

(21) Appl. No.: 15/581,334

(22) Filed: Apr. 28, 2017

(65) Prior Publication Data

US 2018/0314728 A1  Nov. 1, 2018

(51) Int. Cl.
*G06F 16/00* (2019.01)
*G06F 16/23* (2019.01)
(Continued)

(52) U.S. Cl.
CPC ...... *G06F 16/2379* (2019.01); *G06F 11/1471* (2013.01); *G06F 11/1474* (2013.01); *G06F 16/1734* (2019.01); *G06F 16/1865* (2019.01)

(58) Field of Classification Search
CPC ...... G06F 21/60; G06F 3/04842; G06F 21/51; G06F 8/65; G06F 21/604; G06F 21/6218;
(Continued)

(56) References Cited

U.S. PATENT DOCUMENTS 5,201,044 A * 4/1993 Frey, Jr. ............. G06F 11/1471
714/16
6,732,124 B1 * 5/2004 Koseki ............... G06F 11/1435
(Continued)

OTHER PUBLICATIONS

Symantec Corporation, "Veritas™ File System Programmer's Reference Guide", Solaris, Version 5.0, 2006, 90 pages.
(Continued)

*Primary Examiner* — Yicun Wu
(74) *Attorney, Agent, or Firm* — Jaffery Watson Mendonsa & Hamilton

(57) ABSTRACT

Some examples relate to performing application-defined object logging through a file system journal. In an example, a file system may determine during execution of an operation for an application whether a callback function is specified for the operation. In response to the determination, file system may invoke the callback function. File system may receive an object defined by the application. File system may link a copy of the object with a file system transaction associated with the operation in a journal of file system. File system may determine whether file system transaction is committed. In response to the determination, file system may write a copy of the object from the journal to an event log file. File system may allow the application to determine whether file system transaction is committed by enabling access to the event log file.

20 Claims, 3 Drawing Sheets

(51) Int. Cl.
*G06F 16/17* (2019.01)
*G06F 16/18* (2019.01)
*G06F 11/14* (2006.01)

(58) Field of Classification Search
CPC .............. G06F 21/6227; G06F 21/6245; G06F 2221/2141; G06F 3/0482; G06F 8/20; G06F 8/34; G06F 8/38; G06F 8/41; G06F 8/60; G06F 21/54; G06F 21/552; G06F 21/554; G06F 21/56; G06F 3/0608; G06F 3/0481; G06F 3/04847; G06F 3/0631; G06F 3/0683; G06F 11/14; G06F 11/16; G06F 11/3006; G06F 11/3034; G06F 11/3072; G06F 11/3476; G06F 12/0804; G06F 15/16; G06F 16/2358; G06F 2201/87; G06F 3/01; G06F 9/4401; G06F 9/45533; G06F 9/466; G06F 11/1441; G06F 11/2094; G06F 12/0238; G06F 16/134; G06F 16/184; G06F 16/27; G06F 16/285; G06F 16/35; G06F 16/904; G06F 16/951; G06F 2212/202; G06F 3/0607; G06F 3/0625; G06F 3/0638; G06F 3/064; G06F 3/0643; G06F 3/0647; G06F 3/0685; G06F 3/0689; G06F 11/07; G06F 11/0736; G06F 11/0751; G06F 11/0769; G06F 11/0772; G06F 11/0787; G06F 11/0793; G06F 11/1004; G06F 11/1407; G06F 11/141; G06F 11/1417; G06F 11/1433; G06F 11/1438; G06F 11/1448; G06F 11/1471; G06F 11/1666; G06F 11/20; G06F 11/2015; G06F 11/203; G06F 11/2046; G06F 11/2097; G06F 11/3664; G06F 12/0815; G06F 12/0868; G06F 16/18; G06F 16/211; G06F 16/2365; G06F 16/2393; G06F 2009/4557; G06F 21/572; G06F 21/602; G06F 21/629; G06F 21/645; G06F 2212/1024; G06F 2212/263; G06F 2212/463; G06F 2221/2143; G06F 8/654; G06F 8/71; G06F 9/45558; G06F 9/505; G06F 9/5083; G06F 9/542
See application file for complete search history.

(56) References Cited

U.S. PATENT DOCUMENTS

| | | | |
|---|---|---|---|
| 7,636,736 B1* | 12/2009 | Kumar | G06F 16/122 |
| 7,698,306 B2 | 4/2010 | Watanabe et al. | |
| 7,890,469 B1* | 2/2011 | Maionchi | G06F 16/10 |
| | | | 707/654 |
| 8,452,734 B2 | 5/2013 | Munegowda et al. | |
| 9,020,987 B1 | 4/2015 | Nanda et al. | |
| 9,208,031 B2* | 12/2015 | Mace | G06F 11/1435 |
| 9,965,505 B2* | 5/2018 | Avati | G06F 16/2358 |
| 2009/0182781 A1* | 7/2009 | Nair | G06F 16/86 |
| 2011/0029484 A1* | 2/2011 | Park | G06F 16/24568 |
| | | | 707/634 |
| 2016/0124812 A1* | 5/2016 | Sarkar | G06F 11/0751 |
| | | | 711/162 |

OTHER PUBLICATIONS

Microsoft, "FindFirstChangeNotification function", available online at <https://web.archive.org/web/20160917093937/https://msdn.microsoft.com/en-us/library/window/desktop/aa364417(v=vs.85).aspx>, Sep. 17, 2016, 5 pages.

Microsoft, "Change Journals", available online at <https://web.archive.org/web/20170218083559/https://msdn.microsoft.com/en-us/library/windows/desktop/aa363798(v=vs.85).aspx>, Feb. 18, 2017, 2 pages.

Michael Kerrisk, "Filesystem notification, part 1: An overview of dnotify and inotify", available online at <https://lwn.net/Articles/604686/>, 2014, 15 pages.

John Mainzer, "RFC: Metadata Journaling to Improve Crash Survivability" RFC THG 2007-08-01.v2, The HDF Group, Aug. 22, 2008, pp. 1-13.

European Search Report and Search Opinion Received for EP Application No. 18171115.1, dated Aug. 27, 2018, 5 pages.

Vijay Chidambaram et al., "Optimistic Crash Consistency," SOSP '13, Nov. 2013, pp. 1-16, ACM, Available at: <research.cs.wisc.edu/adsl/Publications/optfs-sosp13.pdf>.

\* cited by examiner

APPLICATION-DEFINED OBJECT LOGGING THROUGH A FILE SYSTEM JOURNAL

BACKGROUND

A large amount of data stored these days is in the form of data files or "files", which are typically organized by a file system. A file system is generally an integral part of an operating system or may be installed separately as an extension of the operating system. It provides the underlying structure that a computing device uses to organize data on a storage medium.

BRIEF DESCRIPTION OF THE DRAWINGS

For a better understanding of the solution, embodiments will now be described, purely by way of example, with reference to the accompanying drawings, in which.

DETAILED DESCRIPTION

Figure 1:
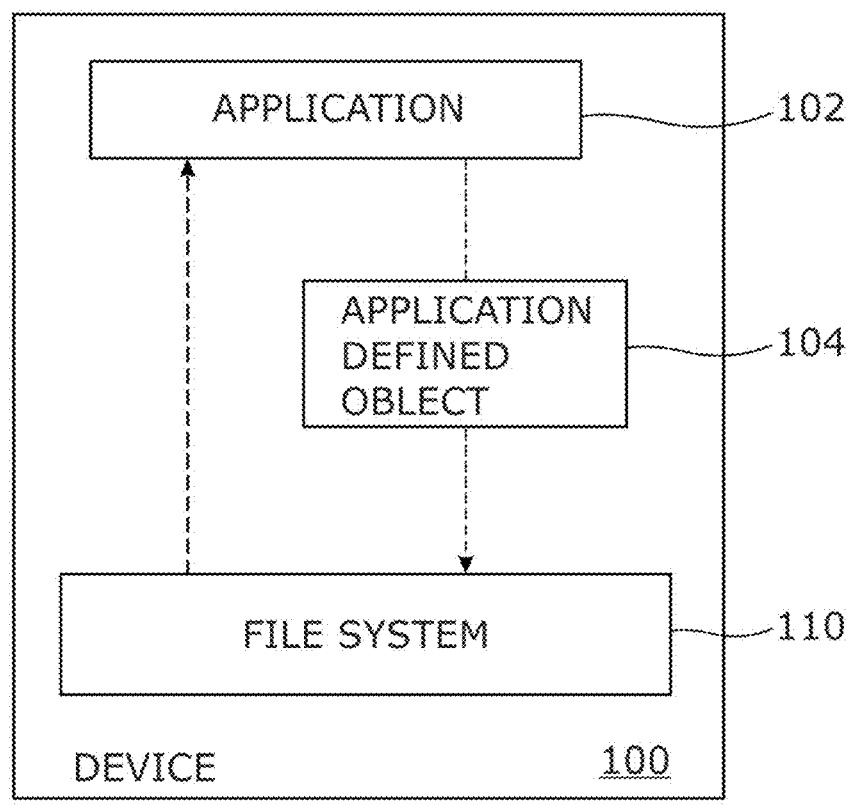
FIG. 1 is a block diagram of an example device for performing application-defined object logging through a file system journal.

A computer file or "file" is the basic component of a file system. Each piece of data on a storage device accessible through a file system and given a file name and an inode may be called a "file". A file may contain application data, such as text files, image files, video files, and the like, or it may be an executable file or program. A file system provides a mechanism for a user to organize data hierarchically under directories and files.

Some applications like backup utilities, auditing programs, etc. may rely on knowing whether a file system operation is committed to persistent storage. Unable to make this determination with certainty may result in application inconsistency. For example, a backup utility may desire to record file creations, deletions and modifications, then read the contents of the changed files in order to copy them to a backup device. A distributed object storage file system may prefer to record a unique object id and a checksum. An auditing system may like to record file names and credentials of the modifier.

Some approaches to capture file system operations include recording file system operations in an event log file. The event log file may be generated by the file system or by an application that registers to notifications. The application may read through the event log file and process the events. However, in these approaches committing of file system operations and event log records may not be atomic. In the event of a crash, there may be inconsistencies between the file system and the event log. If the file system operation is committed and the event log record is not, then the event log may miss processing an event. If the event log is committed and the file system operation is not, then the event log may include a spurious event. In both cases, it may be difficult for the application to reconcile the difference between the event log and the file system. These approaches do not include the capability to tag an application-defined object with file system operations, which may enable an application to determine, in the event of a system failure, whether a file system operation has been successfully committed to persistent storage.

To address these technical challenges, the present disclosure describes various examples for performing application-defined object logging through a file system journal. In some examples, a file system may determine during execution of an operation for an application whether a callback function is specified for the operation. In response to the determination that the callback function is specified for the operation, the file system may invoke the callback function. The file system may receive an object defined by the application that is returned in response to the invocation of the callback function. The file system may link a copy of the object with a file system transaction associated with the operation in a journal of the file system. The file system may determine whether the file system transaction is committed. In response to the determination that the file system transaction is committed, the file system may write a copy of the object from the journal to an event log file. The file system may allow the application to determine whether the file system transaction is committed by enabling access to the event log file.

Thus, examples described herein provide mechanisms where a file system may log an application-defined object along with file system metadata that may allow an application to know with certainty whether a particular file system operation is successfully committed to persistent storage.

FIG. 1 is a block diagram of an example device 100 for linking an application-defined object with a file system transaction. In some examples, device 100 may represent any type of computing device capable of reading machine-executable instructions, for example, via a processor. Examples of the computing device may include, without limitation, a desktop computer, a notebook computer, a tablet computer, a server, a thin client, a mobile device, a personal digital assistant (PDA), and the like.

In some examples, device 100 may be a storage device or system. Device 100 may be a primary storage device such as, but not limited to, random access memory (RAM), read only memory (ROM), processor cache, or another type of dynamic storage device that may store information and machine-readable instructions that may be executed by a processor. For example, Synchronous DRAM (SDRAM), Double Data Rate (DDR), Rambus DRAM (RDRAM), Rambus RAM, non-volatile memory (NVM), etc. Device 100 may be a secondary storage device such as, but not limited to, a floppy disk, a hard disk, a CD-ROM, a DVD, a pen drive, a flash memory (e.g. USB flash drives or keys), a paper tape, an Iomega Zip drive, and the like. In some examples, device 100 may be a Direct Attached Storage (DAS) device, a Network Attached Storage (NAS) device, a tape drive, a magnetic tape drive, a data archival storage system, or a combination of these devices. In some examples, device 100 may be a file storage system or a file archive system.

In some examples, device 100 may include a file system 110. In some examples, file system 110 may be a journaling file system. Some non-limiting examples of a journaling file system may include like NTFS, Ext3, and Ext4. In another example, file system 110 may include a copy on write (CoW) file system which uses in-memory journal and record all changes including metadata as another copy of modified blocks.

In some examples, file system 110 may include a plurality of layers. For example, file system 110 may include a virtual file system (VFS) layer and physical file system layer. The VFS may be an abstraction layer on top of the physical file system layer. The VFS may allow client applications to access different types of physical file systems in a uniform way. The VFS may, for example, be used to access local and network storage devices transparently without the client application realizing the difference. The VFS may specify an interface between the kernel and a physical file system.

The physical file system may be concerned with the physical operation of device 100. It may process physical blocks to be read or written. The physical file system may handle buffering and memory management, and manage the physical placement of blocks in specific locations on the storage medium.

In some examples, file system 110 may determine during execution of a file system operation for an application 102 whether a callback function is specified for the operation. As used herein, the term "application" may include a user space computer application (machine-readable instructions) or an operating system kernel. Some non-limiting examples of the application may include a backup application, an auditing application, an analytics application, and a replication application. Some non-limiting examples of the file system operation may include: creation and/or deletion of files and directories; creation and deletion of extended attributes; permission change on files and directories; and modification and extension of files. In some examples, application 102 may be present on an external device, which may be communicatively coupled to device 100.

In some examples, application 102 may specify, for example, via an Application Programming Interface (API) a callback function for an operation. The callback function may return an application-defined object 104. The callback function may be passed by application 102 to file system 110. As used herein, the term "object" may include a variable, a data structure, data, metadata, a function and/or information specifying a method or a rule. The object 104 may include information relevant to an application. To provide an example, a backup application may define a type of an operation, a path of a file, etc. in an object 104. In another example, an analytics application may specify in an object 104 a rule to log all metadata changes to an event log file depending on file system transactions along with operation errors, if any. To provide another example, a snapshot-based disaster recovery application that relies on file system changes between two snapshots to compute the list of changes to be replicated may specify in an object 104 a rule for file system 110 to log all changes in an event log file consistent with transaction records for all operations that took place between two snapshots.

In some examples, application 102 may define a size of the object 104, for example, via an API. In some examples, the operation(s) for which a callback function is defined may be published by file system 110 in a header file. In some examples, the object 104 may be logged in a configuration record file. Thus, in some examples, the configuration record file may serve as a record of objects defined by various applications for different operations.

When file system 110 executes an operation for application 102, file system 110 may check whether a callback function has been specified by application 102 for the operation. In response to a determination by file system 110 that the callback function is specified for the operation, file system 110 may invoke the callback function. In some examples, callback function, when invoked, may return the object 104 defined by application 102. Thus, file system 110 may receive the object 104 defined by application 102 in response to the invocation of the callback function. In an example, file system 100 may receive the object via a Virtual File System layer. In some examples, callback function may return a size of the object 104, as defined by application 102. File system 110 may receive the size of the object defined by application 102 in the callback function.

File system 110 may link a copy of the object 104 with a file system transaction associated with the operation in a journal of file system 110. As mentioned earlier, in some examples, file system 110 may be a journaling file system. A journaling file system may keep track of changes not yet committed to the file system's persistent storage part by recording the intentions of such changes in a data structure known as a "journal". File system may maintain a journal of metadata modifications in order to recover consistently and quickly from a crash. Metadata modifications may be bunched into transactions. Journaling may keep metadata consistent by bundling the modifications into a single transaction. A copy of modified metadata may first be written to the journal along with information that links all modifications in a transaction. In some examples, the journal may be a circular log.

As used herein, a "transaction" may refer to a single update of file system 110. A transaction may be considered an atomic unit of update that helps keep file system 110 consistent. For example, removing a node from a persistent linked list which may involve two metadata modifications: a) Update the pointer in the previous node to point past the removed node; and b) Free the removed node. These two modifications may be bundled into a single transaction.

File system 110 may link a copy of the object 104 returned by the callback function with a transaction associated with the operation in a journal of file system 110. The file system transaction corresponding to the operation may include one or more sub-transactions, each representing different phases of file system's 100 internal sub-operations. The main transaction for a file system's 100 operation may be called as a root transaction. In an example, the linking of the object 104 with the file system journal may be performed by appending a sub-transaction to the file system operation.

As mentioned earlier, the callback function may return a size of the object 104, as defined by application 102. The size of the object 104 may enable file system 110 to determine an amount of space to be allocated for the transaction associated with the operation in the journal.

File system 110 may determine whether the file system transaction is committed. As mentioned earlier, a transaction may group operations as a unit. A transaction is not done until it is committed. As used herein, the term "committed" (or "commit") may refer to a scenario wherein a system may buffer operations such as file writes until a transaction commits and then write the modified blocks to disk. In some examples, a "commit" may include writing file system updates, writing metadata updates, and writing a commit block. Once committed, a transaction is durable. If a transaction fails to complete, it may be rolled back. In some examples, logging of objects in the event log file may occur as part of file system transaction corresponding to the application's operation subjected to transaction commit or roll back should device undergoes crash recovery while the application operation was under progress.

In response to a determination by file system 110 that the file system transaction is committed, file system 110 may write a copy of the object 104 from the journal to an event log file. In the event device crashes or file system 110 fails due to any reason before the file system transaction is committed, file system 110 may not write a copy of the object 104 from the journal to an event log file. The committing of the file system transaction and write to event log file may be atomic and crash consistent such that both or neither may commit. In case the event log write fails, the file system transaction may be invalidated. In some examples, the event log file may be visible to a user.

File system 110 may allow the application to determine whether the file system transaction is committed by enabling access to the event log file. In some examples, allowing the application to determine whether the file system transaction is committed may comprise allowing the application to determine whether the copy of the object 104 is present in the event log file. In response to the determination that the copy of the object 104 is present in the event log file, the application may be able to determine that the file system transaction is committed. In an example, the file system journal may determine the commit of transaction for the operation and upon commit, write out a copy of the object 104 describing the operation to the event log file for processing and consumption by an external application.

In another example, allowing the application to determine whether the file system transaction is committed may comprise allowing the application to determine whether the copy of the object 104 is not present in the event log file. In response to the determination that the copy of the object 104 is not present in the event log file, the application may be able to determine that the file system transaction is not committed. In some examples, the application may determine whether the file system transaction is committed during a recovery process after device failure.

In some examples, the object 104 describing the file system operation may be defined by file system 110 and appended to the transaction corresponding to the file system operation such that the change log record describing the file system operation gets committed to the event log file upon file system transaction commit. File system 110 may allow an external application to access the event log file to determine if the corresponding file system operation is committed. File system 110 may thus provide a crash consistent method for tracking file system changes between two points in time.

Figure 2:
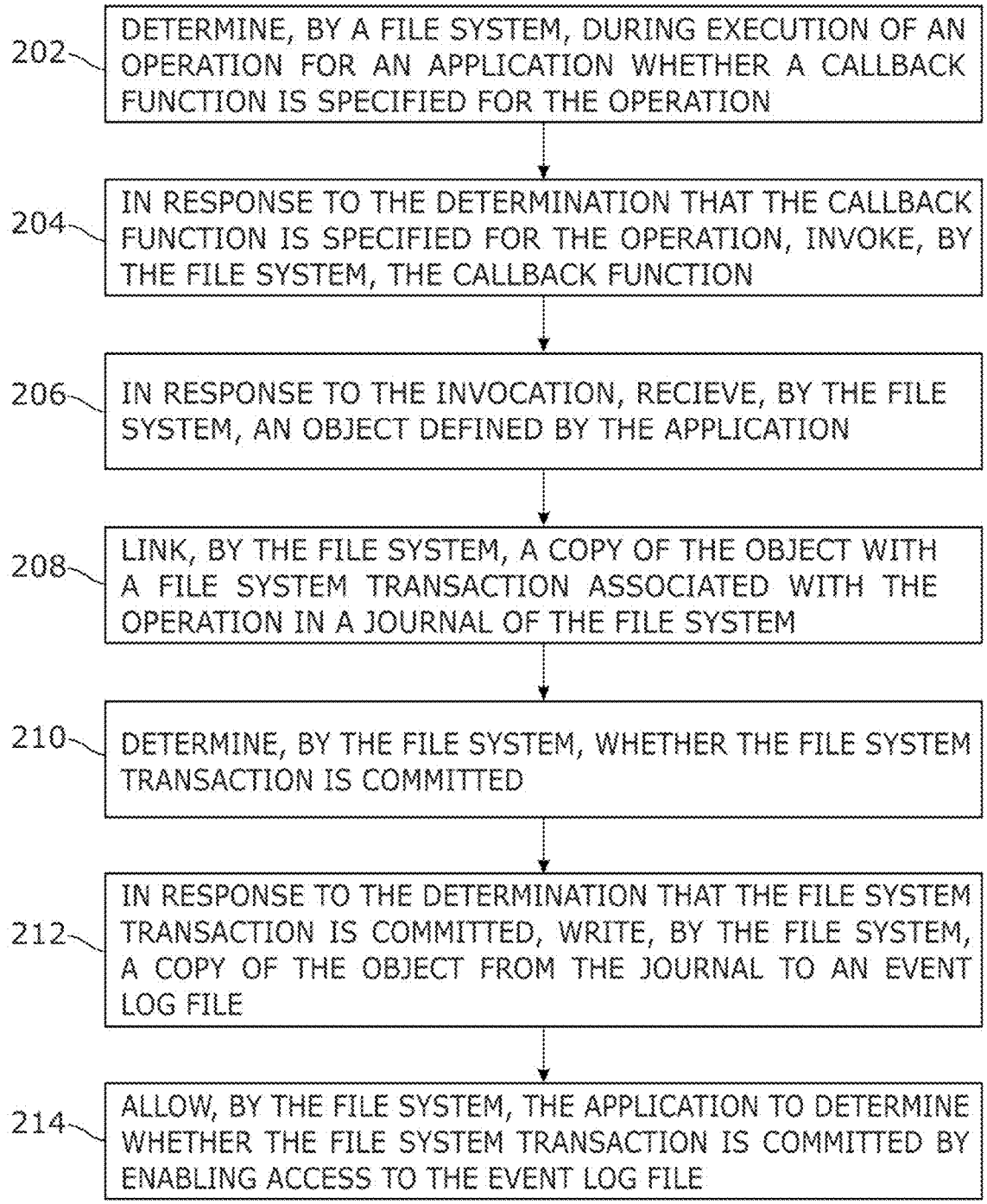
FIG. 2 is a flow chart of an example method of performing application-defined object logging through a file system journal.

FIG. 2 is a flow chart of an example method 200 of performing application-defined object logging through a file system journal. The method 200, which is described below, may be executed on a device such as device 100 of FIG. 1. However, other devices (for example, a computing device or a storage device) may be used as well. At block 202, a file system may determine during execution of an operation for an application whether a callback function is specified for the operation. At block 204, in response to the determination that the callback function is specified for the operation, the file system may invoke the callback function. At block 206, the file system may receive an object defined by the application that is returned in response to the invocation of the callback function. At block 208, the file system may link a copy of the object with a file system transaction associated with the operation in a journal of the file system. At block 210, the file system may determine whether the file system transaction is committed. At block 212, in response to the determination that the file system transaction is committed, the file system may write a copy of the object from the journal to an event log file. At block 214, the file system may allow the application to determine whether the file system transaction is committed by enabling access to the event log file during recovery from a failure of a device that includes the file system.

Figure 3:
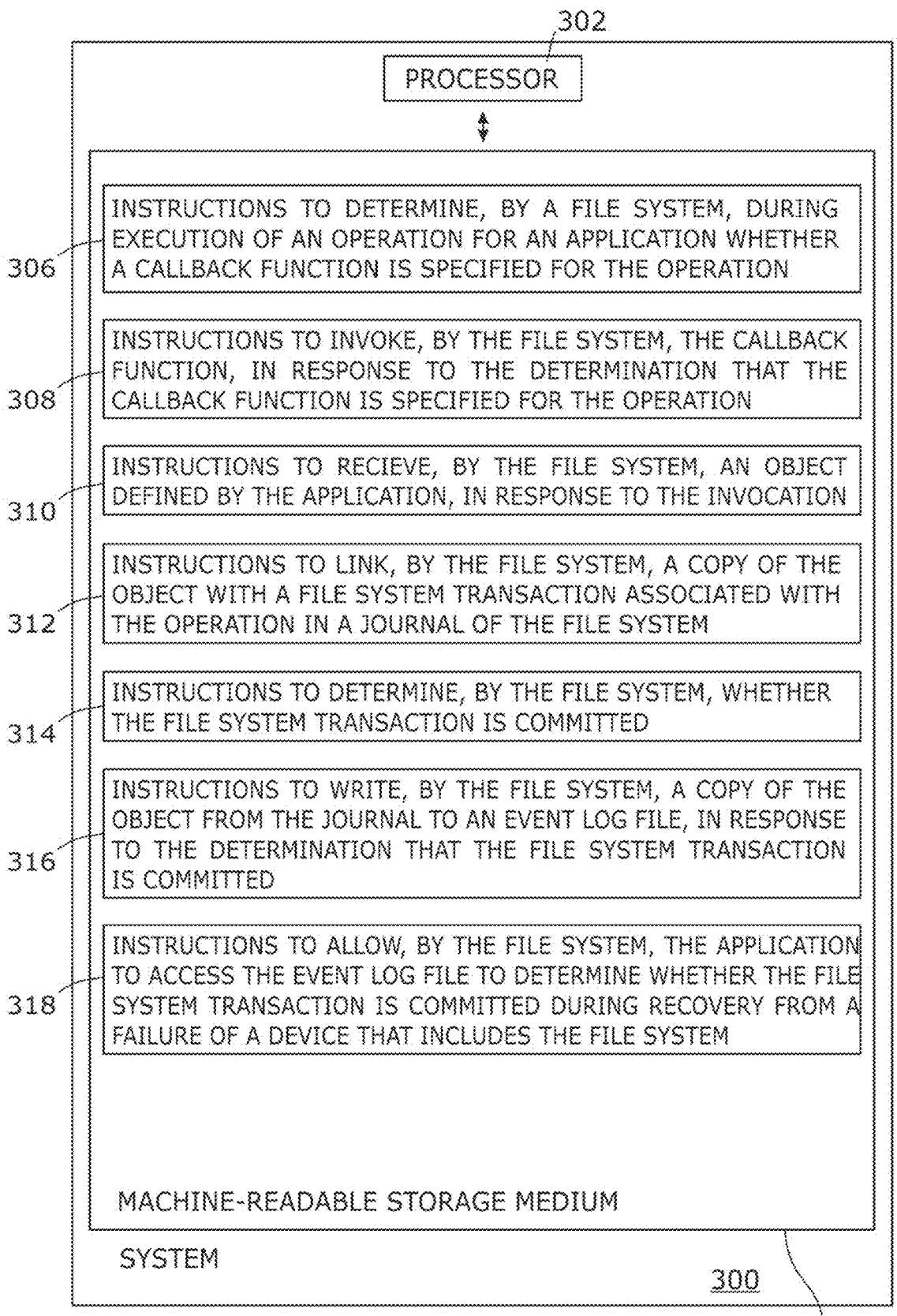
FIG. 3 is a block diagram of an example system including instructions in a machine-readable storage medium for performing application-defined object logging through a file system journal.

FIG. 3 is a block diagram of an example system 300 including instructions in a machine-readable storage medium 304 for performing application-defined object logging through a file system journal. System 300 includes a processor 302 and a machine-readable storage medium 304 communicatively coupled, for example, through a system bus. Processor 302 may be any type of Central Processing Unit (CPU), microprocessor, or processing logic that interprets and executes machine-readable instructions stored in machine-readable storage medium 304. Machine-readable storage medium 304 may be a random access memory (RAM) or another type of dynamic storage device that may store information and machine-readable instructions that may be executed by processor 302. For example, machine-readable storage medium 304 may be Synchronous DRAM (SDRAM), Double Data Rate (DDR), Rambus DRAM (RDRAM), Rambus RAM, non-volatile memory (NVM), etc. or storage memory media such as a floppy disk, a hard disk, a CD-ROM, a DVD, a pen drive, and the like. In some examples, machine-readable storage medium 304 may be a non-transitory machine-readable medium. In some examples, machine-readable storage medium 304 may be remote but accessible to system 300.

Machine-readable storage medium 304 may store instructions 306, 308, 310, 312, 314, 316, and 318. In some examples, instructions 306 may be executed by processor 302 to determine, by a file system, during execution of an operation for an application whether a callback function is specified for the operation. Instructions 308 may be executed by processor 302 to invoke, by the file system, the callback function, in response to the determination that the callback function is specified for the operation. Instructions 310 may be executed by processor 302 to receive, by the file system, an object defined by the application that is returned in response to the invocation of the callback function. Instructions 312 may be executed by processor 302 to log the object defined by the application in a configuration record file, wherein the logging occurs as part of the file system transaction associated with the operation. Instructions 314 may be executed by processor 302 to determine, by the file system, whether the file system transaction is committed. Instructions 316 may be executed by processor 302 to write, by the file system, a copy of the object from the journal to an event log file, in response to the determination that the file system transaction is committed. Instructions 318 may be executed by processor 302 to allow, by the file system, the application to determine whether the file system transaction is committed by enabling access to the event log file during recovery from a failure of the device that includes the file system.

For the purpose of simplicity of explanation, the example method of FIG. 2 is shown as executing serially, however it is to be understood and appreciated that the present and other examples are not limited by the illustrated order. The example systems of FIGS. 1, and 3, and method of FIG. 2 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, NVM, NVMe, NVRAM, NVDIMMs, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
   determining, by a file system, during execution of an operation for an application, whether a callback function is specified for the operation, wherein the file system is to log events that have not yet been committed to a file system journal;
   in response to determining that the callback function is specified for the operation, invoking, by the file system, the callback function;
   receiving, by the file system, an object defined by the application that is returned in response to the invocation of the callback function;
   linking, by the file system, a copy of the object with a file system transaction associated with the operation in the file system journal; and
   atomically committing the file system transaction and a change log record to an event log file, such that both committing the file system transaction and the change log record occur or neither occur, wherein the atomically committing includes:
      determining, by the file system, whether the file system transaction is committed;
      in response to the determination that the file system transaction is committed, writing, by the file system, a copy of the object from the file system journal to the event log file; and
      allowing, by the file system, the application to determine whether the file system transaction is committed by enabling access to the event log file.

2. The method of claim 1, wherein allowing the application to determine whether the file system transaction is committed comprises:
   allowing the application to determine whether the copy of the object is present in the event log following atomically committing the file system transaction and the change log record to the event log file; and
   in response to a determination that the copy of the object is present in the event log file, enabling the application to determine that the file system transaction is committed.

3. The method of claim 1, wherein allowing the application to determine whether the file system transaction is committed comprises:
   allowing the application to determine whether the copy of the object is not present in the event log file following atomically committing the file system transaction and the change log record to the event log file; and
   in response to a determination that the copy of the object is not present in the event log file, enabling the application to determine that the file system transaction is invalidated.

4. The method of claim 1, further comprising:
   recording the object defined by the application in a configuration record file.

5. The method of claim 1, wherein linking, by the file system, the copy of the object describing the operation with the file system transaction associated with the operation in the file system journal enables tracking of the operation for crash consistency.

6. The method of claim 1, further comprising appending one or more sub-transactions associated with the operation to the file system operation.

7. The method of claim 1, further comprising:
   buffering file write operations until a transaction commits; and
   writing one or more modified data blocks to a disk after the transaction commits.

8. A system, comprising:
   a processor; and
   a file system to:
      determine during execution of an operation for an application whether a callback function is specified for the operation, wherein the file system is to log events that have not yet been completed in a file system journal;
      invoke, in response to the determination that the callback function is specified for the operation, the callback function;
      receive an object defined by the application that is returned in response to the invocation of the callback function;
      receive, in response to the invocation, a size of the object defined by the application;
      link a copy of the object with a file system transaction associated with the operation in the file system journal; and
      atomically commit the file system transaction and a change log record to an event log file, such that both committing the file system transaction and the change log record occur or neither occur, wherein to atomically commit includes:
         determining whether the file system transaction is committed;
         writing, in response to the determination that the file system transaction is committed, a copy of the object from the file system journal to the event log file; and
         allowing the application to determine whether the file system transaction is committed by enabling access to the event log file.

9. The system of claim 8, wherein the application is to determine whether the file system transaction is committed during recovery of the device from a failure.

10. The system of claim 8, wherein the operation is published by the file system in a header file.

11. The system of claim 8, wherein the object is defined via an Application Programming Interface (API) for the file system.

12. The system of claim 8, wherein the object includes information relevant to the application.

13. A non-transitory machine-readable storage medium comprising instructions, the instructions executable by a processor to:
- determine, by a file system, during execution of an operation for an application whether a callback function is specified for the operation, wherein the file system is to log events that have not yet been committed to a file system journal;
- invoke, by the file system, the callback function, in response to the determination that the callback function is specified for the operation;
- receive, by the file system, an object defined by the application that is returned in response to the invocation of the callback function;
- link, by the file system, a copy of the object with a file system transaction associated with the operation in the file system journal; and
- atomically commit the file system transaction and a change log record to an event log file, such that both committing the file system transaction and the change log record occur or neither occur, wherein to atomically commit includes:
  - determining, by the file system, whether the file system transaction is committed;
  - writing, by the file system, a copy of the object from the file system journal to the event log file, in response to the determination that the file system transaction is committed; and
  - allowing, by the file system, the application to access the event log file to determine whether the file system transaction is committed during recovery from a failure of a device that includes the file system to determine whether the copy of the object is present in the event log file.

14. The storage medium of claim 13, further comprising instructions to:
- receive, by the file system, a size of the object from the callback function, in response to the invocation.

15. The storage medium of claim 13, wherein the event log file is visible to a user.

16. The storage medium of claim 13, wherein the instructions to receive include instructions to receive the object from a Virtual File System.

17. The storage medium of claim 13, wherein the application includes one of a backup application, an auditing application, an analytics application, and a data replication application.

18. The storage medium of claim 13, further comprising instructions to cause the file system to append one or more sub-transactions associated with the operation to the file system operation.

19. The storage medium of claim 13, further comprising instructions to cause the file system to:
- buffer file write operations until a transaction commits; and
- write one or more modified data blocks to a disk after the transaction commits.

20. The storage medium of claim 13, further comprising instructions to cause the file system to append one or more sub-transactions associated with the operation to the file system operation.

* * * * *